US007665088B1

(12) United States Patent
Bugnion et al.

(10) Patent No.: US 7,665,088 B1
(45) Date of Patent: *Feb. 16, 2010

(54) CONTEXT-SWITCHING TO AND FROM A HOST OS IN A VIRTUALIZED COMPUTER SYSTEM

(75) Inventors: Edouard Bugnion, Palo Alto, CA (US); Scott W. Devine, San Jose, CA (US); Mendel Rosenblum, Stanford, CA (US)

(73) Assignee: VMware, Inc., Palo Alto, CA (US)

( * ) Notice: Subject to any disclaimer, the term of this patent is extended or adjusted under 35 U.S.C. 154(b) by 865 days.

This patent is subject to a terminal disclaimer.

(21) Appl. No.: 11/219,070

(22) Filed: Sep. 2, 2005

Related U.S. Application Data

(63) Continuation of application No. 10/307,273, filed on Nov. 27, 2002, now Pat. No. 6,944,699, which is a continuation of application No. 09/151,175, filed on Sep. 10, 1998, now Pat. No. 6,496,847.

(60) Provisional application No. 60/085,685, filed on May 15, 1998.

(51) Int. Cl.
G06F 9/455 (2006.01)
G06F 9/46 (2006.01)
G06F 13/24 (2006.01)

(52) U.S. Cl. ............... 718/1; 718/100; 718/108; 710/200; 710/269

(58) Field of Classification Search ............ 718/1, 718/101, 108, 100, 102, 103, 104, 105; 703/26, 703/27; 710/200–269
See application file for complete search history.

(56) References Cited

U.S. PATENT DOCUMENTS 4,253,145 A * 2/1981 Goldberg ............ 703/21
4,742,447 A 5/1988 Duvall et al.
4,747,040 A 5/1988 Blanset et al.
4,787,031 A 11/1988 Karger et al.
4,792,895 A 12/1988 Tallman
4,812,967 A * 3/1989 Hirosawa et al. ............ 710/269
4,926,322 A 5/1990 Stimac et al.
4,974,159 A * 11/1990 Hargrove et al. .............. 703/27

(Continued)

OTHER PUBLICATIONS

Office Action dated Sep. 2, 2004 in U.S. Appl. No. 10/307,273.

(Continued)

*Primary Examiner*—Meng-Ai An
*Assistant Examiner*—Abdullah Al Kawsar
(74) *Attorney, Agent, or Firm*—Rajeev Madnawat

(57) ABSTRACT

The invention virtualizes a computer that includes a host computer system, which comprises a processor, memory, and physical system devices. A conventional operating system (referred to below as the "host operating system" or "HOS") is installed on the hardware. A computer program product that is executable within the host computer system comprises computer-executable code for implementing an interface software layer, preferably a virtual machine monitor, between the host system and a virtual machine; for reading in and storing state information of the processor associated with the HOS; and for logically decoupling the HOS from the processor with respect to pre-determined functions of the interface software layer and the virtual machine by setting the processor state information to settings associated with the interface software layer.

7 Claims, 4 Drawing Sheets

U.S. PATENT DOCUMENTS

| | | | | |
|---|---|---|---|---|
| 5,088,031 | A | * | 2/1992 | Takasaki et al. ............. 718/100 |
| 5,134,580 | A | | 7/1992 | Bertram et al. |
| 5,167,023 | A | | 11/1992 | de Nicolas et al. |
| 5,222,224 | A | | 6/1993 | Flynn et al. |
| 5,255,379 | A | | 10/1993 | Melo |
| 5,291,605 | A | * | 3/1994 | Takagi et al. ................. 710/48 |
| 5,307,504 | A | | 4/1994 | Robinson et al. |
| 5,319,760 | A | | 6/1994 | Mason et al. |
| 5,440,710 | A | | 8/1995 | Richter et al. |
| 5,488,716 | A | * | 1/1996 | Schneider et al. ............. 714/10 |
| 5,511,217 | A | | 4/1996 | Nakajima et al. |
| 5,522,075 | A | | 5/1996 | Robinson et al. |
| 5,553,291 | A | * | 9/1996 | Tanaka et al. .................. 718/1 |
| 5,652,869 | A | | 7/1997 | Herdeg et al. |
| 5,652,872 | A | | 7/1997 | Richter et al. |
| 5,721,922 | A | * | 2/1998 | Dingwall .................... 718/103 |
| 5,832,205 | A | | 11/1998 | Kelly et al. |
| 5,893,144 | A | | 4/1999 | Wood et al. |
| 6,075,938 | A | * | 6/2000 | Bugnion et al. ............... 703/27 |
| 6,289,396 | B1 | | 9/2001 | Keller et al. |
| 6,412,035 | B1 | | 6/2002 | Webber |
| 6,681,238 | B1 | * | 1/2004 | Brice et al. .................... 718/1 |

OTHER PUBLICATIONS

Response to Office Action dated Oct. 4, 2004 in U.S. Appl. No. 10/307,273.
Hall et al., "Virtualizing the VAX Architecture", ACM, 1991, pp. 380-389.
Liedtke, "Toward Real Microkernels", Communications of the ACM, vol. 39, No. 9, Sep. 1996, pp. 70-77.
Goldberg, "Survey of Virtual Machine Research," IEEE Computer, vol. 7, No. 6, Jun. 1974, pp. 34-45.
Ebcioglu et al., "Daisy: Dynamic Compilation for 100% Architectural Compatibility," IBM Research Report RC 20538, Aug. 5, 1996, 84 pages.
Bugnion et al., "Disco: Running Commodity Operating Systems on Scalable Multiprocessors," ACM Transactions on Computer Systems, vol. 15, No. 4, Nov. 1997, pp. 412-447.
Bressoud et al., "Hypervisor-based Fault Tolerance," SIGOPS '95, Dec. 1995, pp. 1-11.
Rosenblum et al., "Using the SimOS Machine Simulator to Study Complex Computer Systems," ACM Transactions on Modeling and Computer Simulation, vol. 7, No. 1, Jan. 1997, pp. 78-103.
Creasy, "The Origin of the VM/370 Time-Sharing System," IBM J. Res. Develop., vol. 25, No. 5, Sep. 1981, pp. 483-490.
Office Action dated May 22, 2002 in U.S. Appl. No. 09/151,175.
Response to Office Action dated Jun. 19, 2002 in U.S. Appl. No. 09/151,175.
Office Action dated Sep. 23, 2002 in U.S. Appl. No. 09/151,175.
Response to Office Action dated Sep. 30, 2002 in U.S. Appl. No. 09/151,175.
Chapin et al., "Hive: Fault Containment for Shared-Memory Multiprocessors," Stanford Computer Systems Lab Publication, ACM Symposium, Dec. 1995, pp. 12-25.
Rosenblum et al., "Implementing Efficient Fault Containment for Multiprocessors," Communications of the ACM, vol. 39, No. 9, 1996, pp. 52-61.

* cited by examiner

CONTEXT-SWITCHING TO AND FROM A HOST OS IN A VIRTUALIZED COMPUTER SYSTEM

CROSS-REFERENCE TO RELATED APPLICATIONS

This application is a continuation of U.S. patent application Ser. No. 10/307,273, filed 27 Nov. 2002, now U.S. Pat. No. 6,944,699 which is a continuation of U.S. patent application Ser. No. 09/151,175, filed 10 Sep. 1998, which issued as U.S. Pat. No. 6,496,847 on 17 Dec. 2002, which in turn claims priority from U.S. Provisional Patent Application No. 60/085,685, filed 15 May 1998. This application claims priority of all of these previous applications.

BACKGROUND OF THE INVENTION

1. Field of the Invention

This invention relates to a computer architecture, including a virtual machine monitor, and a related operating method that allow virtualization of the resources of a modern computer system.

2. Description of the Related Art

The operating system plays a special role in today's personal computers and engineering work stations. Indeed, it is the only piece of software that is typically ordered at the same time the hardware itself is purchased. Of course, the customer can later change operating systems, upgrade to a newer version of the operating system, or even re-partition the hard drive to support multiple boots. In all cases, however, a single operating system runs at any given time on the computer. As a result, applications written for different operating systems cannot run concurrently on the system.

Various solutions have been proposed to solve this problem and eliminate this restriction. These include virtual machine monitors, machine simulators, application emulators, operating system emulators, embedded operating systems, legacy virtual machine monitors, and boot managers. Each of these systems is described briefly below.

Virtual Machine Monitors

One solution that was the subject of intense research in the late 1960's and 1970's came to be known as the "virtual machine monitor" (VMM). See, for example, R. P. Goldberg, "Survey of virtual machine research," IEEE Computer, Vol. 7, No. 6, 1974. During that time, moreover, IBM Corp. adopted a virtual machine monitor for use in its VM/370 system.

A virtual machine monitor is a thin piece of software that runs directly on top of the hardware and virtualizes at least some of the resources of the machine in which it is implemented, or at least of some machine, such that the operating system cannot determine the presence of the VMM. Consequently, when the hardware interface is compatible with the underlying hardware, the same operating system can run either on top of the virtual machine monitor or on top of the raw hardware.

Virtual machine monitors were popular at a time where hardware was scarce and operating systems were primitive. By virtualizing all the resources of the system, multiple independent operating systems could coexist on the same machine. For example, each user could have her own virtual machine running a single-user operating system.

The research in virtual machine monitors also led to the design of processor architectures that were particularly suitable for virtualization. It allowed virtual machine monitors to use a technique known as "direct execution," which simplifies the implementation of the monitor and improves performance. With direct execution, the VMM sets up the processor in a mode with reduced privileges so that the operating system cannot directly execute its privileged instructions. The execution with reduced privileges generates traps, for example when the operating system attempts to issue a privileged instruction. The VMM thus needs only to correctly emulate the traps to allow the correct execution of the operating system in the virtual machine.

As hardware became cheaper and operating systems more sophisticated, VMMs based on direct execution began to lose their appeal. Recently, however, they have been proposed to solve specific problems. For example, the Hypervisor system provides fault-tolerance, as is described by T. C. Bressoud and F. B. Schneider, in "Hypervisor-based fault tolerance," ACM Transactions on Computer Systems (TOCS), Vol. 14. (1), February 1996; and in U.S. Pat. No. 5,488,716 "Fault tolerant computer system with shadow virtual processor," (Schneider, et al.). As another example, the Disco system runs commodity operating systems on scalable multiprocessors. See "Disco: Running Commodity Operating Systems on Scalable Multiprocessors," E. Bugnion, S. Devine, K. Govil and M. Rosenblum, ACM Transactions on Computer Systems (TOCS), Vol. 15, No. 4, November 1997, pp. 412-447.

Virtual machine monitors can also provide architectural compatibility between different processor architectures by using a technique known as either "binary emulation" or "binary translation." In these systems, the VMM cannot use direct execution since the virtual and underlying architectures mismatch; rather, they must emulate the virtual architecture on top of the underlying one. This allows entire virtual machines (operating systems and applications) written for a particular processor architecture to run on top of one another. For example, the IBM DAISY system has recently been proposed to run PowerPC and x86 systems on top of a VLIW architecture. See, for example, K. Ebcioglu and E. R. Altman, "DAISY: Compilation for 100% Architectural Compatibility," Proceedings of the 24th International Symposium on Computer Architecture, 1997.

Machine Simulators/Emulators

Machine simulators, also known as machine emulators, run as application programs on top of an existing operating system. They emulate all the components of a given computer system with enough accuracy to run an operating system and its applications. Machine simulators are often used in research to study the performance of multiprocessors. See, for example, M. Rosenblum, et al., "Using the SimOS machine simulator to study complex computer systems," ACM Transactions on Modeling and Computer Simulation, Vol. 7, No. 1, January 1997. They have also been used to simulate an Intel x86 machine as the "VirtualPC" or "RealPC" products on a PowerPC-based Apple Macintosh system.

Machine simulators share binary emulation techniques with some VMMs such as DAISY. They differentiate themselves from VMMs, however, in that they run on top of a host operating system. This has a number of advantages as they can use the services provided by the operating system. On the other hand, these systems can also be somewhat constrained by the host operating system. For example, an operating system that provides protection never allows application programs to issue privileged instructions or to change its address space directly. These constraints typically lead to significant overheads, especially when running on top of operating systems that are protected from applications.

Application Emulators

Like machine simulators, application emulators also run as an application program in order to provide compatibility across different processor architectures. Unlike machine simulators, however, they emulate application-level software and convert the application's system calls into direct calls into the host operating system. These systems have been used in research for architectural studies, as well as to run legacy binaries written for the 68000 architecture on newer PowerPC-based Macintosh systems. They have also been also been used to run x86 applications written for Microsoft NT on Alpha workstations running Microsoft NT. In all cases, the expected operating system matches the underlying one, which simplifies the implementation. Other systems such as the known Insigna's SoftWindows use binary emulation to run Windows applications and a modified version of the Windows operating system on platforms other than PCS. At least two known systems allow Macintosh applications to run on other systems: the Executer runs them on Intel processors running Linux or Next and MAE runs them on top of the Unix operating system.

Operating System Emulators

Operating system (OS) emulators allow applications written for one given operating system application binary interface (ABI) to run on another operating system. They translate all system calls made by the application for the original operating system into a sequence of system calls to the underlying operating system. ABI emulators are currently used to allow Unix applications to run on Window NT (the Softway OpenNT emulator) and to run applications written for Microsoft's operating systems on public-domain operating systems (the Linux WINE project).

Unlike virtual machine monitors and machine simulators, which are essentially independent of the operating system, ABI emulators are intimately tied with the operating system that they are emulating. Operating system emulators differ from application emulators in that the applications are already compiled for the instruction set architecture of the target processor. The OS emulator does not need to worry about the execution of the applications, but rather only of the calls that it makes to the underlying operating system.

Embedded Operating Systems

Emulating an ABI at the user level is not an option if the goal is to provide additional guarantees to the applications that are not provided by the host operating system. For example, the VenturCom RTX Real-Time subsystem embeds a real-time kernel within the Microsoft NT operating system. This effectively allows real-time processes to co-exist with traditional NT processes within the same system.

This co-existence requires the modification of the lowest levels of the operating system, that is, its Hardware Abstraction Layer (HAL). This allows the RTX system to first handle all I/O interrupts. This solution is tightly coupled with WindowsNT, since both environments share the same address space and interrupts entry points.

Legacy Virtual Machine Monitors

Certain processors, most notably those with the Intel architecture, contain special execution modes that are specifically designed to virtualize a given legacy architecture. This mode is designed to support the strict virtualization of the legacy architecture, but not of the existing architecture.

A legacy virtual machine monitor consists of the appropriate software support that allows running the legacy operating system using the special mode of the processor. Specifically, Microsoft's DOS virtual machine runs DOS in a virtual machine on top of Microsoft Windows and NT. As another example, the freeware DOSEMU system runs DOS on top of Linux.

Although these systems are commonly referred to as a form of virtual machine monitor, they run either on top of an existing operating system, such as DOSEMU, or as part of an existing operating system such as Microsoft Windows and Microsoft NT. In this respect, they are quite different from the true virtual machine monitors described above, and from the definition of the term "virtual machine monitor" applied to the invention described below.

Boot Managers

Finally, boot managers such as the public-domain LILO and the commercial System Commander facilitate changing operating systems by managing multiple partitions on the hard drive. The user must, however, reboot the computer to change operating systems. Boot managers therefore do not allow applications written for different operating systems to coexist. Rather, they simply allow the user to reboot another operating system without having to reinstall it, that is, without having to remove the previous operating system.

General Shortcomings of the Prior Art

All of these known systems fail to meet one or more of the following goals: 1) to provide the advantages offered by traditional virtual machine monitors, such as the ability to run multiple arbitrary operating systems concurrently. 2) to provide portability of the virtual machine monitor across a wide range of platforms; and 3) to maximize performance by using the underlying hardware as much as possible.

This invention provides a system that achieves these goals, as well as a related operating method.

SUMMARY OF THE INVENTION

The invention virtualizes a computer that includes a host computer system, which comprises a processor, memory, and physical system devices. A conventional operating system (referred to below as the "host operating system" or "HOS") is installed on the hardware. In particular, the invention provides a computer program product that is executable within the host computer system, and comprises computer-executable code for implementing an interface software layer between the host system and a virtual machine, instructions of which are executed on the processor; for reading in and storing state information of the processor associated with the HOS; and for logically decoupling the HOS from the processor with respect to pre-determined functions of the interface software layer and the virtual machine by setting the processor state information to settings associated with the interface software layer.

The invention also provides code for logically recoupling the HOS to the processor by writing to the processor the processor state information associated with the HOS.

The interface software layer is preferably a virtual machine monitor acting as a system-level interface for the virtual machine.

DETAILED DESCRIPTION

The invention is described below in sections for the sake of clarity. First, two conventional architectures are described in order to make it easier to see the unique features of the invention by way of comparison. Then, the system according to the invention is described as a whole. Finally, the main novel features of the invention are described individually.

Conventional Virtual Machine Monitor Architectures

Figure 1:
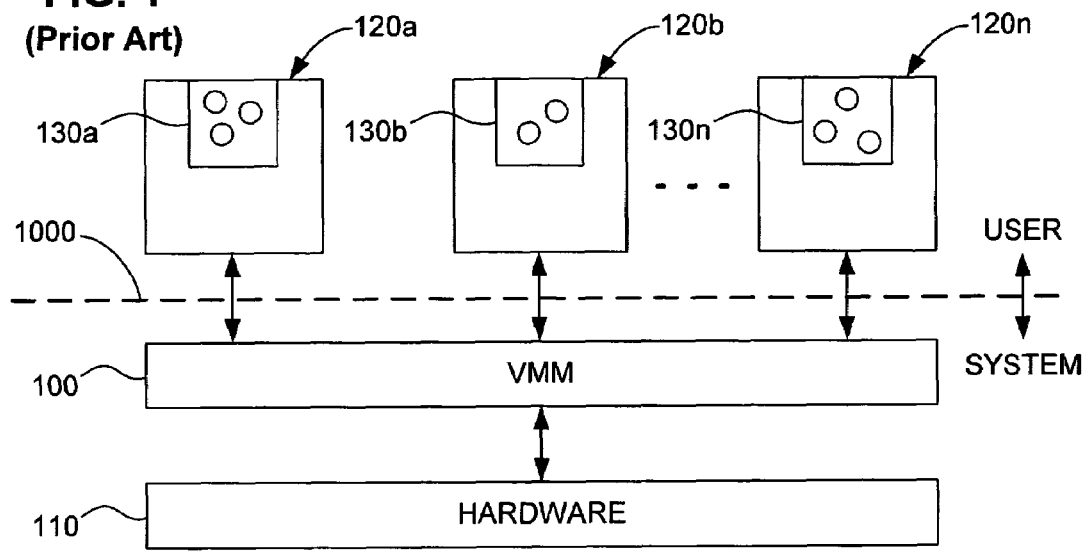
FIG. 1 is a block diagram that illustrates the architecture of a conventional system that incorporates a virtual machine monitor.

FIG. 1 illustrates the conventional system model that incorporates a virtual machine monitor (VMM). The VMM 100 in this known architecture directly accesses the system hardware 110. This hardware includes such known structures as the system processor (one or more) itself, its registers, associated memory devices, any memory management unit MMU, I/O devices, any co-processors, and so on. One or more virtual machines 120a, 120b, . . . , 120n communicate with the VMM 100. Running on each virtual machine is a set of one or more application programs, which are symbolized as circles within the respective blocks 130a, 130b, . . . , 130n. Examples of such an architecture capable of concurrently running one or many virtual machines include the VM/370 and DISCO systems mentioned above. Examples of such an architecture capable of running a single virtual machine on any hardware system include the IBM DAISY and Hypervisor systems mentioned above.

As FIG. 1 shows, the VMM 100 communicates directly with the hardware 110 and thus is at system level. Each virtual machine 120a, 120b, Y, 120n, which consists of its operating system and associated applications, typically operates at user-level. When the VMM uses direct execution, the processor is set in user-mode or at least with reduced privileges, so that the virtual machine cannot directly access the various privileged registers that control the operation of the hardware structure. Rather, privileged instructions trap into the VMM. When the VMM uses binary translation, the VMM's well-known translation algorithm can guarantee that the virtual machine never issues privileged instructions. As a result, the virtual machine can be said to be executing at user-level, since it never accesses the privileged state of the processor independent of the setting of the processor. The separation between the system and user levels is indicated in FIG. 1 by the dashed line 1000.

Because the VMM 100 in the conventional system shown in FIG. 1 can directly access the hardware 110, it is fast. On the other hand, because the VMM must be configured according to the given hardware 110, it cannot be used in other systems. In other words, performance is improved at the cost of less flexibility.

Conventional Machine Emulator Architectures

Figure 2:
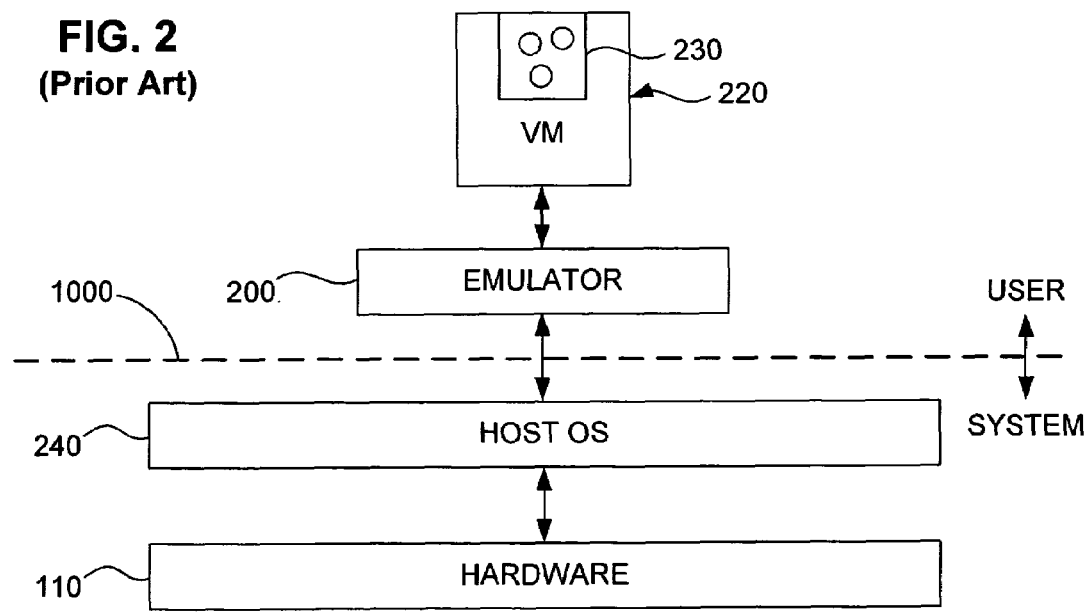
FIG. 2 shows the architecture of a conventional system that incorporates a machine emulator/simulator.

FIG. 2 illustrates the conventional system model that incorporates a machine emulator 200, also known as a machine simulator. A virtual machine 220 is connected to the emulator 200. A set 230 of applications is associated with the virtual machine 220. The device emulator 200 operates as an interface for the virtual machine 220. The machine emulator 200 does not directly access any of the hardware structures 110, but rather communicates its system needs via a host operating system (HOS) 240 call. One example of such a system is SimOS.

As FIG. 2 shows, only the host operating system and the hardware itself operate at the system level. The machine emulator 200, including the virtual machine 220, and the applications 230, all run at user level. As such, as far as the host operating system 240 is concerned, the emulator 200 is nothing more than another application. The emulator thus uses the services of the HOS 240, which in turn manages system resources. As in FIG. 1, the separation between the system and user levels is indicated by the dashed line 1000. This allows greater flexibility, since the emulator is not tied to any one hardware structure, but the inability to directly control system resources makes this architecture slower than the VMM structure shown in FIG. 1.

System Architecture According to the Invention

Figure 3:
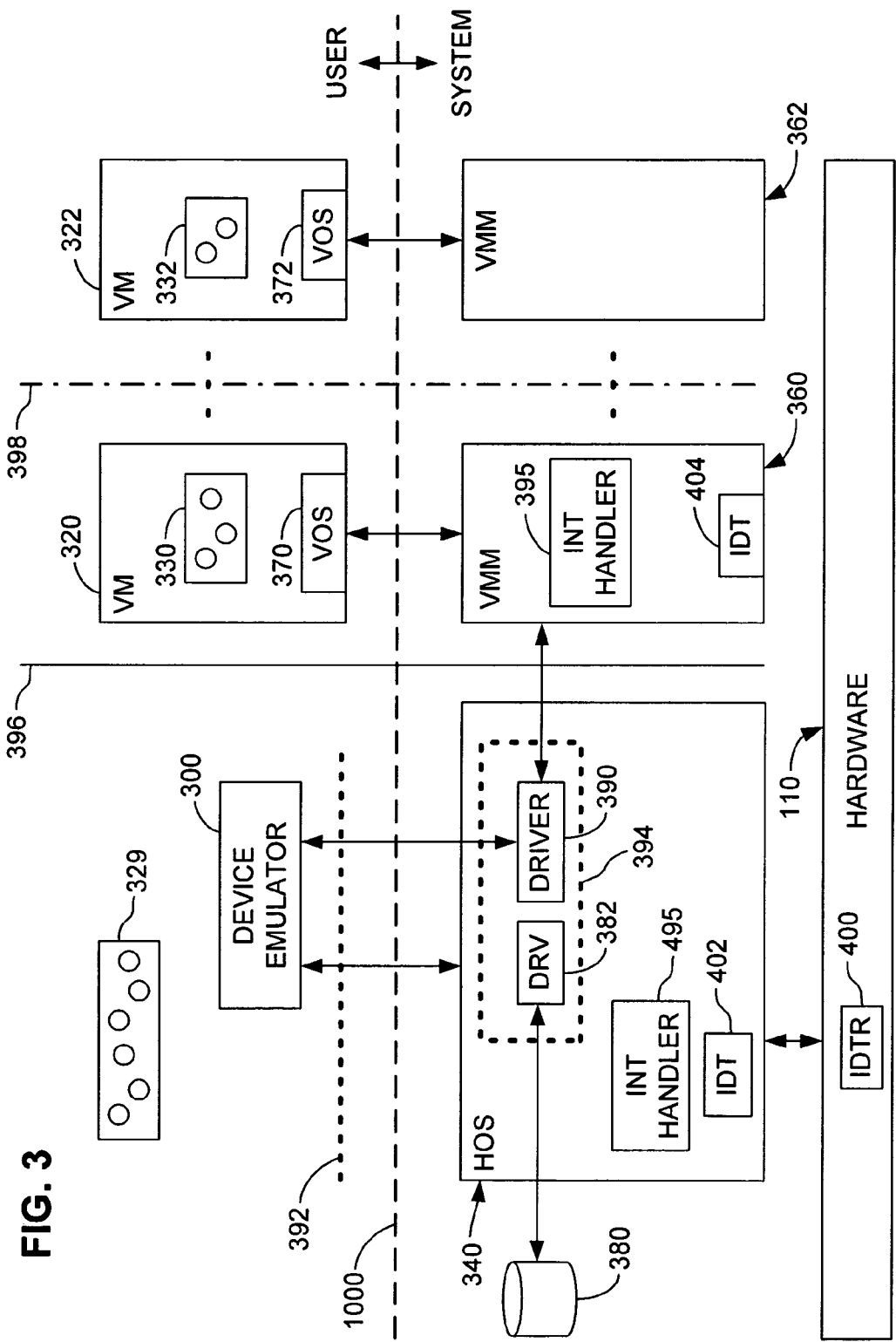
FIG. 3 is a block diagram that illustrates the high-level system architecture of a system that incorporates a system-level virtual machine monitor (VMM) according to the invention that is also co-resident with a host operating system.

FIG. 3 shows the invention in its broadest terms: a user-level device emulator 300 runs on top of a protected host operating system 340 and is combined with at least one unconstrained, system-level virtual machine monitor (VMM) 360. The VMM 360 directly uses portions of the hardware's 110 processor to execute an associated virtual machine (VM) 320. Each component of the virtual computer system is virtualized either by the device emulator 300, the VMM 360, or some combination of both elements. The VMM 360 preferably handles the virtualization of the core components of the virtual computer system such as the processor and memory management unit, while the device emulator 300 preferably virtualizes I/O devices.

The use of a user-level device emulator 300 allows the invention to meet the second goal stated above. The application portion of the system takes care of all system-specific emulation and relies on the existing host operating system 340 to perform this emulation.

The use of a system-level virtual machine monitor 360 allows the invention to meet the third goal of maximal performance. In order to make this possible, the invention also provides that the VMM 360 can configure the processor and its memory management unit (MMU) independently of any constraints imposed by the host operating system—failure to do so would prevent the VMM from setting up the processor and MMU so that the virtual machine 320 can directly take advantage of them. The VMM according to the invention allows its associated virtual machine 320 to use as many components of the hardware directly and safely as possible given the processor architecture. For example, the ability to use direct execution to run the virtual machine is a function of the current state of the virtual processor.

FIG. 3 shows two virtual machine monitors 360, 362 installed in the system, each supporting a respective virtual machine 320, 322. As will be made clearer in the following discussion, the system according to the invention makes it possible to include any number of VMMs in a given implementation, limited only by available memory and speed requirements, and to switch between the various included VMMs. Two are shown by way of example only. Below, it is assumed merely for the sake of simplicity that the VMM 360 is the one actively in operation on the system. Any discussion of "the" VMM 360 or "the" virtual machine 322 thus applies equally to any other VMMs and VMs included in any given implementation of the invention.

A set of applications (symbolized by circles) is indicated in FIG. 3 by the block 329. This set of applications is assumed to be designed to run "normally" via the existing host operating system (HOS) 340. In other words, the applications 329 are written for the HOS 340. Other applications, however, may not be. For example, an application written to run on one of Microsoft's operating systems, such as any of the Windows systems, will not normally run on the Unix operating system, and vice versa. If the host operating system is, for example, some version of Windows, with Intel-based hardware, then a Unix application cannot normally be expected to run on the system. This invention makes this possible.

Assume that the virtual machine 320 is designed as a virtual Unix system and that the applications 330 are thus Unix-based applications. The virtual machine 320 then will also include a virtual operating system (VOS) 370, which communicates with the "real," or "physical" system hardware via the VMM 360. Other applications 332 running on another virtual machine 322 will similarly run via a respective virtual operating system 372 and the associated VMM 362. Note that the invention allows running many different types of applications on the same computer system, regardless of what the host operating system is. Each application is thus associated with its intended operating system, either the host operating system 340 (applications 329), or with a respective virtual operating system 370, 372 associated in turn with each respective VMM 320, 322.

Current computer systems, and especially personal computers, support a wide range of devices that each interact in a different manner with the system software. As a result, each device requires special system software support. A device driver is typically downloaded into the operating system to provide this support. A conventional virtual machine monitor (see FIG. 1) virtualizes and therefore manages all the resources of the system, including any I/O devices that are present on the system. Supporting all the devices possibly found on a computer system would, however, require the integration of all of their associated device drivers into the monitor. Fortunately, a VMM does not need to access I/O devices directly as long as it can rely on an existing operating system to do so. However, the VMM does need to be able to reconfigure the processor and MMU to virtualize the system. Such reconfigurations are not possible in a user-level process that runs on an operating system that offers protection. This would require the HOS and VMM to be operating at the same time, which is not possible using the conventional architecture.

This invention overcomes this limitation by providing that the VMM 360 according to the invention is co-resident with the existing protected operating system (the host operating system 340). The VMM runs independently of the host operating system—it is in no way an extension of the operating system, but rather operates with its own address space and with its own interrupt and exception handlers. The virtualization system also includes a device emulator 300 that runs as a user-level application on top of the host operating system 340. Because it operates as a typical process running on top of the HOS, the device emulator 300 according to the invention can use standard operating system calls to access physical devices 380 such as (but not limited to) a disk drive.

The co-residency of the VMM and the HOS at system level implies that both can independently configure the hardware processor, and that the HOS retains all of its function. This allows not only the device emulator 300 but also other independent applications to operate in the HOS context.

In actual implementations of the invention that include more than one VMM, there is preferably a different user-level device emulator for each VMM. This maintains the functional and contextual separation of the different VMMs (described below), simplifies the design of each device emulator, and allows for the greatest degree of flexibility and portability of each VMM. The HOS can then schedule the VMMs, via their respective device emulators, just like it schedules other user-level applications (such as applications 329). It is also possible, however, to include a single device emulator to handle all VMMs, although this would greatly impair or rule out the generality, flexibility, portability and simplicity provided by having dedicated device emulators.

In order for the system-level VMM 360 to use this ability of the user-level device emulator 300 to issue standard operating system calls, some interface is required. According to the invention, this interface is provided by a driver 390, which is downloaded into or otherwise installed or included in the HOS 340. The driver 390 also allows each VMM to be loaded into the system and also implements a switch (described further below) between the host operating system context and the VMM context.

The illustrated, preferred architecture according to the invention requires some minimal support from the host operating system. For example, the host operating system 340 must support down-loadable device drivers (since the driver 390 acts as one), and these must execute at the most privileged level. Also, either the user-level process (such as the device emulator 300) or the driver 390 must be able to allocate certain pages of memory with the guarantee that the operating system will not reclaim them. This functionality, known as "locking pages," is routinely used by conventional device drivers and the requirement is therefore no practical limitation to the general applicability of the invention.

The concept of a "protected" operating system, that is, a system in which only the host operating system is able to issue instruction calls that will affect the privileged state, is typically associated with an interface widely known as the System Call Application Program Interface (API). A different API, known as a Device Driver API, similarly provides an interface between system-level device drivers and the HOS. FIG. 3 shows both types of APIs in the system, which are symbolized by dotted lines and labeled 392 and 394, respectively.

The API 392 is the interface exported by the HOS to its applications. This API is normally a layer of software that defines the set of services offered by the HOS to user-level applications. On operating systems that provide protection, API system calls are implemented by a secure mechanism that allows transitions of the processor between user-level mode and system-level mode. In such systems, the API 392 itself checks whether calls from applications are permissible, and prevents impermissible calls from reaching and affecting the proper running of the host operating system.

One example of a user API 392 request would be a call from an application whose execution requires a level of privilege not granted to applications running at user level, such as instruction calls that would alter certain important registers used only by the processor for its internal control. Another call that would normally not be allowed would be an attempt by an application to directly control a disc, such as instructions directing the read head to a particular track and sector, or that would alter necessary system files. Examples of an API 392 to applications include the POSIX system for UNIX operating systems.

The API 394 is the interface exported by the HOS to its downloadable device drivers. Note that downloadable device drivers typically operate at the system level with the same privileges as the HOS itself; otherwise, it would take far too long for, for example, a modem driver to do its job with proper synchronization. As such, these device drivers are "inside" the protective API 392 to applications. Indeed, they are typically downloaded to become a functional part of the host operating system itself. In these cases, the API 394 is commonly not an actual body of programming code within the operating system, but rather is simply a convention followed by producers of device drivers. In FIG. 3, a conventional device driver 382 is shown as the driver for the external device 380.

In other words, the API 394 is normally an agreed-upon set of unprotected function calls that downloaded device drivers may issue. The API 394 thus does not offer any active protection to the operating system; rather each respective device driver views the API 394 as a permissible set of operations that it may perform that might also change the state of the operating system. One example of a device driver 394 request would be a request made by a disk driver to "lock" a certain number of given pages into memory with the guarantee that the operating system will not use these pages for other purposes until allowed to by the holder of the lock. An example of an API 394 to device drivers is the DDK interface by Microsoft.

One of the unique features of the invention is that the VMM 360 (which is at the system level) is able to issue what are known as "remote procedure calls" (RPC) to the device emulator 300 (which is at the user level) via the driver 390, which is loaded as a conventional device driver into the HOS 340. RPCs are a well-known programming technique, originally described in "Implementing Remote Procedure Calls," A. D. Birrell and B. J. Nelson, ACM Transactions on Computer Systems, 2(1), pp. 39-59, 1984.

In the preferred embodiment of the invention shown in FIG. 3, the principle function of the driver 390 is to act as a "gate" through which the VMM can pass procedure calls to the emulator 300. The driver 390 can thus be coded simply using well-known programming techniques. More importantly, the driver 390 needs to be able to issue only a very small number of device driver API 394 calls. This very thin interface between the driver 390 and the HOS 340 substantially simplifies the task of porting the system according to the invention to a new host operating system.

One type of privilege register that is used in the invention to enable the VMM to be co-resident with the HOS is the register that directs the processor to a table of addresses that point it to instructions to be executed upon sensing any of a predetermined set of interrupts, which may be both hardware and software. By way of example, in the widely prevalent Intel x86 architectures, this privilege register is known as the "interrupt descriptor table register" (IDTR), which is a register within the hardware processor 110 itself, and which, in the figures, is labeled 400. The corresponding table of addresses (the exception vector) for the respective interrupts is known, accordingly, as the "interrupt descriptor table" (IDT). As FIG. 3 illustrates, the HOS 340 includes IDT 402 and the VMM 360 includes its own parallel IDT 404. Analogous registers and tables are found in other architectures; the conventions and terminology commonly used in Intel x86 architectures are used in this description by way of example only.

Figure 4:
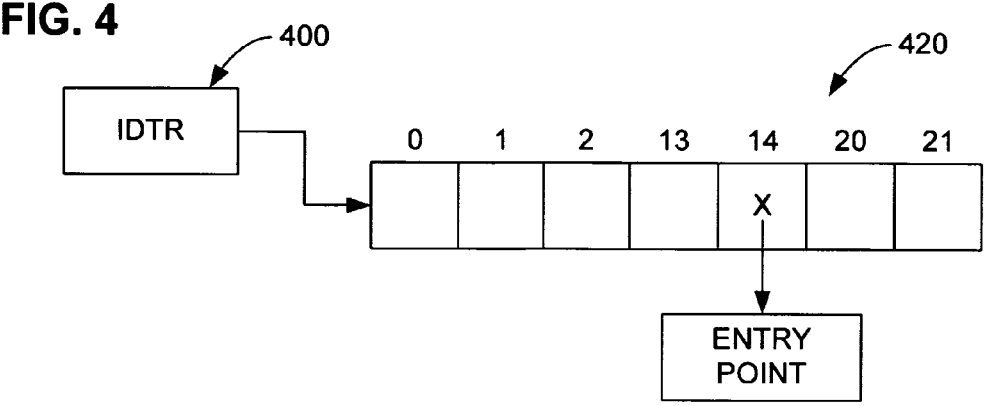
FIG. 4 illustrates certain registers and tables used for handling exceptions in the invention.

FIG. 4 illustrates the function and structure of the IDTR 400 and an IDT 420 in greater detail. The IDTR 400 is a privilege register of the hardware processor in certain known architectures. The address in this register in turn operates as a pointer to the address in memory of an exception table or "vector" 402 (the IDT). The HOS sets up the IDTR register at system start-up; otherwise, the system processor would not know what to do if certain pre-defined "errors" (exceptions) occur.

The exception vector 402 is, as is mentioned above, a table that points to the addresses of the respective entry points to be executed after the respective exceptions or interrupts occur. In FIG. 4, by way of example, the exception vector includes links to entry points for exceptions numbers 0, 1, 2, 13, 14, 20 and 21. (These numbers represent exceptions that commonly occur in Intel-based architectures.) Although the establishment and operation of these registers and vectors is well known, consider the following example.

Assume that a memory page fault is pre-defined to be exception number 14, and that the processor has just sensed a page fault. The system, that is, the hardware processor, will first address the IDTR 400, which will return the address in physical memory of the position in the exception vector 402 for exception number 14. This memory position will in turn point to the corresponding entry point, which is the address of the first instruction the processor is to execute after the corresponding exception (here, a page fault) occurs. In short, this structure tells the processor where to get its next instruction whenever certain pre-defined non-standard conditions (roughly, "faults") occur.

Refer again to FIG. 3. The programming code that contains the instructions to be carried out upon occurrence of an exception or interrupt is known as an interrupt handler. According to the invention, each VMM 360 also includes a dedicated interrupt handler 395, which is a virtualization of the interrupt handler for the corresponding virtual machine 320, and is also a parallel to the interrupt handler 495 of the host operating system 340.

According to the invention, an IDT is set up in each virtual machine monitor. These IDTs include the exception vectors and entry points for their respective virtual machines. In other words, the system according to the invention is also able to virtualize exception-handling as part of its total context-switching operation.

Total Switch

The switch between the host operating system 340 context and the (that is, each) VMM 360 context requires more than a conventional context switch, such as the one implemented by operating systems to time-share processes. The switch used in the preferred embodiment of the invention is referred to and described below as a "total processor switch" or, simply, a "total switch" since it saves and restores all the registers, segments, floating-point registers, and control registers of the processor included in the given computer hardware 110. Any available memory space may be used to save this information, and actual storage and retrieval may be accomplished using any known technique. The total switch also changes the address space so that the host operating system's address space does not need to be mapped into the VMM's address space. As a result, the VMM has the ability to freely manage all the address space of the system while executing in its own context. Finally, the switch changes the interrupt dispatch entry points, since the VMM according to the invention handles directly all exceptions and interrupts that occur while executing in the VMM context. The total switch preferably first saves the state before setting it according to the target context in order to facilitate the inverse operation.

The use of the total switch has significant consequences for the system. First, the host operating system (HOS) 340 is totally unaware of the existence of the VMM—only the driver 390, which implements the HOS side of the total switch, is aware. In other words, although the HOS and VMM are co-resident, both at the system level, their contexts, using this invention, can be completely separate, independent, and protected from each other. Consequently, no modifications are needed to the HOS, not even at its lowest Hardware Abstraction Layer (HAL). Here, "context" refers to the state that is set and restored during the total switch, for example, the state of the address space, the general-purpose registers, floatingpointer registers, privileged registers, interrupt vectors and hardware exception vectors. In FIG. 3, this separation between the VMM and HOS contexts is symbolized the vertical line 396. Similarly, each VMM included in the system functions separately, independently and protected from all other VMMs. This separation is symbolized in FIG. 3 by the dash-dotted line 398.

Second, the HOS 340 and VMM 360 have disjoint address spaces. The VMM can therefore take over the entire programmable virtual address space and is not limited by the address space of the host operating system. The VMM in turn will make this complete address space available to the virtual machine 320. As a result, execution on the virtual machine can directly use the memory management unit (MMU), which is included along with the processor in the given computer hardware 110. According to the invention, the VMM configures all the internal registers of the processor to match the requirements of the virtual machine, with no restrictions imposed by the host operating system. For example on a segmented architecture, the virtual machine can directly use the hardware segments.

Another consequence of the invention's use of the total switch is that the HOS 340 and the VMM 360 have different interrupt and exception entry points. The VMM completely takes over the machine and only voluntarily relinquishes control to the HOS.

Although the two contexts—VMM- and HOS-controlled—are independent of each other, they preferably cooperate for the allocation of machine resources. For example, the VMM preferably does not manage I/O devices. This greatly simplifies its design and implementation and improves its portability. Furthermore, preferably neither the VMM nor the virtual machine directly accesses I/O devices. Rather, the VMM uses an RPC to call the driver 390 in the HOS or the emulator 300 in the user-level process to initiate I/O requests.

Additionally, the VMM preferably redirects all I/O interrupts to the HOS. The VMM then calls the driver 390 in order to emulate the interrupt in the HOS context. The preferred interrupt-handling mechanism is described in greater detail below in connection with the discussion of FIG. 6. On timer interrupts, the driver 390 not only emulates the interrupt, but it also returns to the execution of the user-level process. This return path allows the scheduler of the HOS to schedule another process. As a result, the virtual machine uses a fair share of the processor according to the priority of the user-level device emulator 300.

As yet another example of the preferred VMM-HOS cooperation, the VMM and the virtual machine access only the physical memory pages that have been allocated and locked down in memory by either the device emulator 300 or the driver 390. The VMM can then allocate a memory page by calling back into the HOS context. In this example, the VMM defers to the HOS the management of the physical memory resources. As an example of their cooperation, the VMM may release back to the HOS certain of the memory resources that are currently being used by the virtual machine 320 or the VMM.

Structure of the VMM

Figure 5:
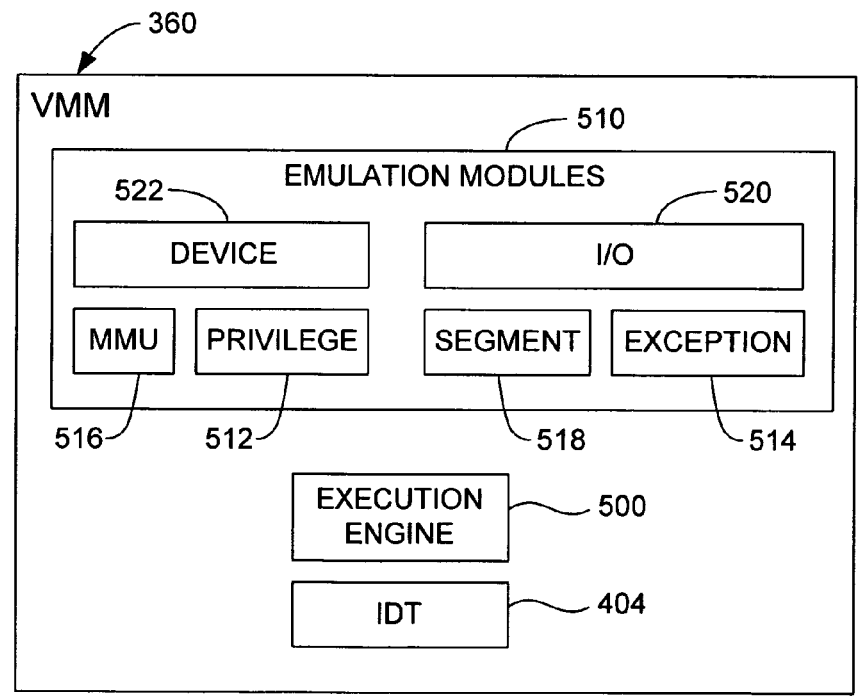
FIG. 5 is a block diagram that shows various exemplary emulation modules that may be incorporated into the VMM used in the invention.

In general, the invention does not require the VMM 360 to be of any particular type. Indeed, this is one of the advantages of the invention. As long as the VMM incorporates the ability to access the user-level emulator 300 via the system-level driver 390, and to handle interrupts as described below, then any known VMM design may be used with in the invention. Nonetheless, by way of example, FIG. 5 illustrates the high-level organization of a VMM in order to make clearer how such a VMM works. As FIG. 5 illustrates, in addition to the components shown in FIG. 3, the VMM 360 includes an execution engine 500 and a set of emulation modules 510.

There are two main known types of execution engines in a VMM: binary translation and direct execution. The concepts "binary translation" and "direct execution" are known in the field of computer system, as are techniques to design and operate the corresponding execution engines. Both engines rely on the same emulation modules 510, which emulate the various components of the virtual machine 320 (FIG. 3). The execution engine handles internally the components of the processor architecture that are not affected by the virtualization. These include, for example, all arithmetic and logical operations issued by the virtual machine.

Any conventional execution engine design may be implemented in the invention. For example, prior systems such as VM/370, DISCO, and Hypervisor are based exclusively on direct-execution techniques, and prior systems such as DAISY are based exclusively on binary translation techniques. This invention is independent of the choice of the execution engine.

The emulation modules 510 are selected using known design methods to be specific to the virtualized architecture. Examples of some common modules are illustrated in FIG. 5. For example, a privileged instruction emulation module 512 emulates the privileged instructions issued by the virtual machine 320 (FIG. 3) in a safe manner, that is, so that the effects of the emulation remain constrained to the virtual machine. This can also be ensured using known design methods.

As is mentioned above, the VMM 360 has its own set of interrupt vectors 404, which are separate from but parallel the interrupt vectors 402 of the host operating system. According to the invention, some exceptions are handled internally by the VMM, while others are forwarded to the virtual operating system (VOS 370—see FIG. 3) running in the virtual machine. The forwarding is implemented in any known manner by an exception emulation module 514, which emulates the trap architecture of the virtual machine. For example, when the virtual machine takes a page fault trap, the VMM sometimes handles the trap internally, that is, without modifying any of the virtual machine's state; sometimes, however, the VMM emulates in software the effect of the hardware trap in the virtual machine.

The applications 330 (FIG. 3) running on the virtual machine 320 will also "expect" to be able to cause other instruction calls to the type of architecture they are designed to run on. Consequently, the VMM 360 will typically include modules to emulate these common features of a computer system. In the illustrated example, emulation modules are shown for a memory management unit 516, memory segment descriptor tables 518, and I/O devices 520.

Emulation of devices is preferably divided into two components. Device emulation that does not require interaction with the physical devices of the system may remain as part of the VMM, as a VMM device emulation module 522, which may be designed in any known manner. Device emulations that do require such interaction are handled as described above by the user-level device emulator 300.

As is mentioned above, the HOS 340 is allowed, according to the invention, to manage resources such as the memory and devices, and to retain most of its normal functions and privileges, such as CPU scheduling. This is so even though the HOS and the VMM are both at the system level.

In general, there is no way for the system to transfer control directly from the VMM to the HOS, since they operate in different contexts, with disjoint address spaces. Recall that a "context" includes the state of all virtual address space, as well as the set of registers (including privilege registers), with all hardware exception and entry points. Nonetheless, there must be some mechanism that allows the system to operate in the VMM context when needed, while still allowing it to revert to the HOS context, for example, to allow a different VMM to be active.

The resetting of the IDTR 400 as part of the total switch is required since the HOS and the VMM are co-resident but operate in disjoint address spaces—an interrupt vector entry point specified in one context would be meaningless in the other context. The changing of the IDTR during the total switch has at least two advantages: First, the HOS (specifically, its interrupt handlers) does not need to be modified to accommodate the VMM—exceptions that occur while the VMM is executing will be processed directly by VMM-specific handlers. Second, this separation also leads to a substantial performance advantage, as the VMM consists of customized, low-overhead handlers without any operating system overhead.

In order to realize these advantages, the VMM and VM according to the invention share the same address space, and the IDT is stored as a part of the VMM's portion of the address space. To understand how the invention accomplishes this, note that device drivers—such as the invention's "Trojan Horse" driver 390—even in most protected systems operate at the same privilege level as the HOS itself and can set the IDTR and IDT. According to the invention, therefore, the IDT 404 for the virtual machine monitor 360 (that is, for each VMM) is loaded by the driver 390 into the VMM's address space, with entry points into the VMM itself.

For example, on an Intel x86, if the memory mappings between the HOS and a VMM were to be completely disjoint, that is, if they had completely distinct contexts, then there would be no way for the processor to get back on the instruction path in the other context once it got out of it. To overcome this, the invention provides for a cross page in the memory, which is a page in memory that is identical, beginning at the same linear address, in both (or, for multiple VMMs, all) contexts. The cross page contains known instruction sequences (specific to the given hardware processor) that change the address space and direct the processor to its next instruction. This cross page only needs to be mapped temporarily in the VMM context's address space, just before the total switch to the HOS, and just after the control returns to the VMM. The VMM uses known techniques to first save the mapping that exists at the address of the cross page before mapping the cross page. The inverse operation restores the mapping before resuming the execution of the virtual machine.

Note that the VMM cannot simply operate in the HOS context—it is necessary for the VMM to get essentially complete control of the system; otherwise, the HOS might begin to carry out its own procedures and defeat the entire reason for having a VMM. This invention makes this possible through implementation of the concept of "co-residency," which means not only that both the HOS and VMM are present at the system level, but also that each is able to operate with complete functionality, with fully maintained but completely separate contexts.

Several differences between the invention and known systems can now be appreciated. For example, most conventional virtual machine monitors and emulators are monolithic. In other words, most known VMM run without a host operating system (such as the VMM/370, Hypervisor, DISCO and DAISY systems), and most machine emulators run entirely at user-level (such as the SimOS system).

The invention also differs significantly from machine emulators for the MacOS, such as the VirtualPC and RealPC systems. The inventors believe, for example, that these systems are also monolithic. In any case, however, the MacOS is an operating system that does not offer any protection and does not clearly separate application code from system code.

As for the Disco system, it re-uses some of the known Silicon Graphics' IRIX device drivers. A modified version of IRIX initializes the machine and then loads the Disco VMM, which then takes over the machine. Unlike the co-resident system according to the invention, the Disco VMM manages both the processor and the main memory of the machine. It returns to the IRIX context only to call the low-level device-specific drivers. Unlike this invention, the DISCO system does not rely on a user-level device emulator, nor on the HOS to manage resources Moreover, unlike this invention, the modified version of IRIX cannot be used as a general-purpose operating system, since it does not control resources.

The legacy virtual machine monitors from Microsoft are integrated as part of Windows95 and Windows NT. The implementation of this legacy VMM in general is tightly integrated with the operating system. In contrast, the implementation according to the invention is portable, requires only a simple extension (the driver 390) of the operating system (which can even be uninstalled when unused) and supports a full VMM.

The Linux DOSEMU system is a legacy 8086 VMM that runs DOS on top of the Linux operating system. It is implemented partially at user-level, and uses an Intel x86-specific system call of Linux to set up the processor in the v-8086 mode. This system calls returns to the user-level VMM on every exception that occurs while the processor is in v-8086 mode. The system-level component of DOSEMU runs as an integral part of the DOS operating system.

In sum, unlike existing architectures, this invention, in its preferred embodiment, is built around a three-component system (user-level device emulator 300, driver 390, and co-resident virtual machine monitor 360) that runs even on a processor with a protected host operating system 310. Examples of such protected operating systems include UNIX and Microsoft NT. These operating systems all clearly separate user-level applications from the operating system by running applications in user mode. Furthermore, the invention includes the total switch, which saves and restores all the processor's state data, including the privileged registers, disjoint address spaces, and the interrupt dispatch table. The use of the total switch is the primary feature of the invention that enables the novel concept of co-residence between a host operating system and a VMM.

Note that the VMM and the device emulator may be coded and implemented using known techniques. As is discussed above, emulators and VMMs are known. Other than as described below, this invention does not relate to the design of the VMM and device emulator as such, since these will vary according to the machine in which the invention is to be incorporated; indeed, according to the invention, different VMMs may be co-resident in the same computer. Rather, one of the principal points of novelty of the invention is the manner in which the VMM, which is co-resident with the HOS at the system level, is able to communicate with the user-level emulator via the low-level driver 390, which is downloaded into the HOS.

Example of VM Device Request with Total Context Switching

Figure 6:
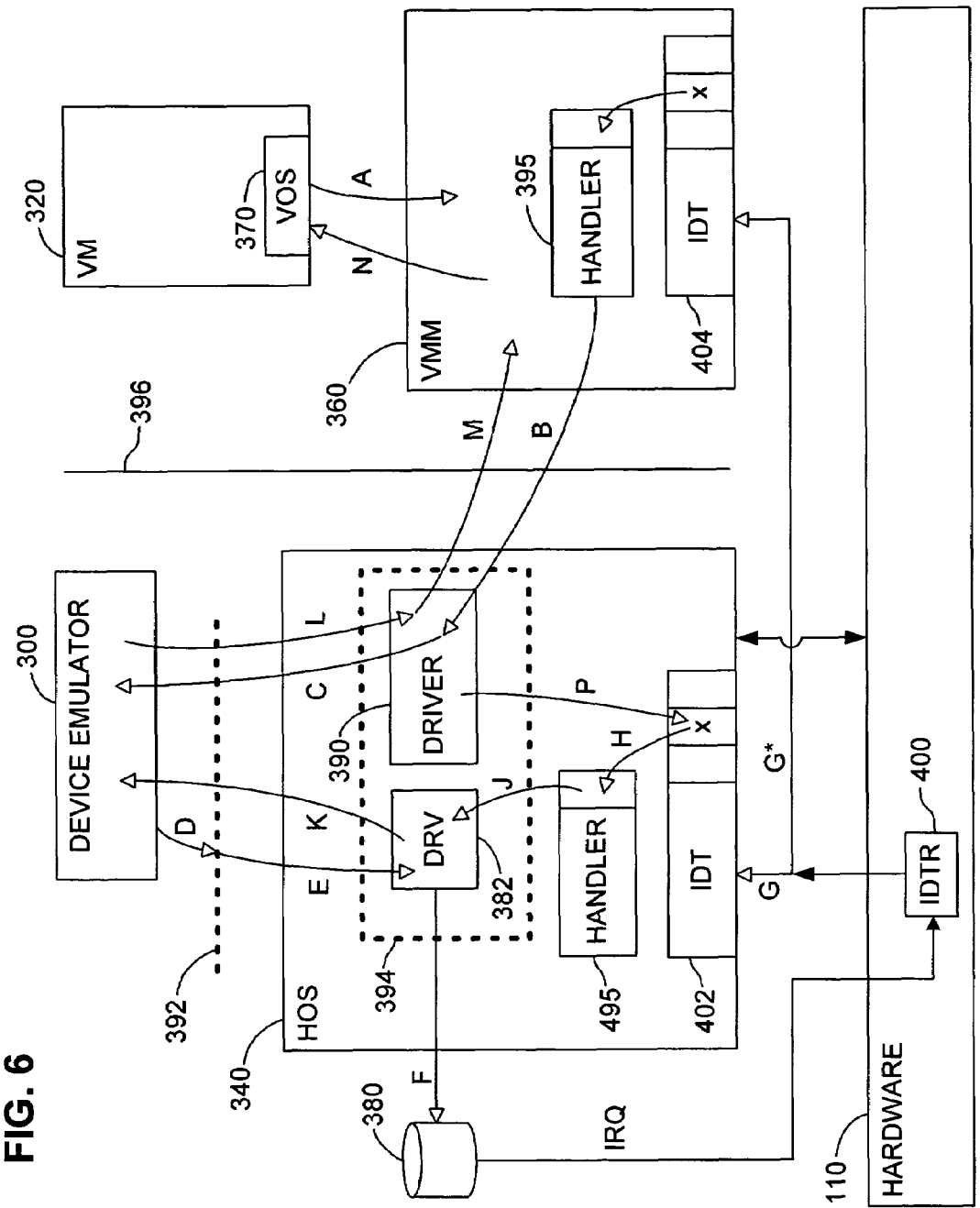
FIG. 6 illustrates one example of how the system according to the invention enables an application designed to run on one operating system can efficiently access an external resource handled by a different, host operating system, by means of the virtualization system according to the invention.

Refer now to FIG. 6, in which the main components of FIG. 3 are reproduced, but in which instruction and control paths are illustrated. FIG. 6 also provides an example of the cooperation between the co-resident entities (HOS 340 and VMM 360) with respect to I/O devices such as a disk 380.

Referring to FIG. 6, consider as an example the interaction that occurs when the virtual machine VM 320 initiates a disk I/O request. The VMM intercepts the I/O commands issued by the VM's 320 virtual operating system 370 (illustrated as path A). At this point, the VM 320 "believes" it is issuing a command to the external I/O device; in fact, however, the request is passed to the VMM 360, in particular, to an I/O emulation module 520 (FIG. 5) included in the VMM.

The VMM 360 then sets all parameters required for the I/O request and initiates the request by passing it via the driver 390 (path B) to the user-level device emulator 300 (path C). The parameters will be predetermined according to convention, and form the arguments of the RPC.

The device emulator 300 then uses the API 392 offered by the HOS 340 to emulate the I/O request, that is, to read or write the disk sectors from the corresponding virtual disks 380. The call to the API is shown as path D, which call is passed in the conventional manner (path E) to the appropriate device driver 382 within the HOS 340. To complete the operation, the HOS will in certain cases request an I/O operation from the corresponding physical device 380 (path F).

When the physical device 380 completes its operation, for example, retrieving a requested portion of a file, it typically interrupts the processor by issuing an external interrupt request (IRQ). Using an IRQ, the much faster central processing unit (CPU) system does not need to suspend other operations while waiting for the slower I/O device to complete its task. Rather, the IRQ acts as a "ready" signal from the I/O device. At this point (unless interrupts are presently masked), the hardware processor dispatches to the interrupt vector specified by the IDT. If the processor is currently executing in the HOS total context, then the processor dispatches to the IDT 402 of the HOS 340 (path G). It then processes the interrupt in the conventional manner, accessing the IDT 402, to get the corresponding entry point in the handler (path H), which then passes conventional signals such as acknowledgement and transfer initiation signals to the device driver 382 (path J). The device driver 382 then begins transfer of the requested data to the device emulator 300 (path K), which in turn passes the data via the driver 390 (path L) to the VMM 360 (path M). The VMM then transfers the requested data to the VM 320 (path N) as if it were the I/O device itself. The data is thus passed back along the reverse path and is made available to the originally calling application, which will never "know" that the actual memory access took place in a different context.

If the processor is currently executing in the VMM total context, then the VMM interrupt handler 395 intercepts the IRQ (path G*) and performs an RPC to the driver 390, which then emulates (by executing an appropriate conventional instruction sequence) the external interrupt in the HOS (path P). Effectively, the HOS 340 handles the interruption as though the processor were previously executing in the downloadable driver 390 when it in fact occurred while executing in the VMM total context—as is discussed above, the driver 390 sets the interrupt vectors to those of the VMM context.

Recall that, upon sensing the IRQ signal (via a predetermined pin) from the device 380, the hardware processor accesses the interrupt descriptor table register IDTR 400 to get the address of the IDT to be used for handling the interrupt. The IDTR can be set by routines at system level such as the VMM (via the driver 390) or by the HOS itself. According to the invention, interrupts that occur when running in the context of the VMM are handled by interrupt handlers in the VMM. Similarly, all interrupts that occur while executing in the HOS context are handled by existing interrupt handlers in the HOS. The operation of the total context switch in this invention is thus symmetrical.

As part of the total switch, the IDTR is changed to point to the IDT of the current sub-system (here: HOS or VMM). The total switch routine uses known techniques to ensure that no interrupts occur during the switch.

This example is another illustration of how the VMM according to the invention is able to remain completely "invisible" to the HOS by "hiding" behind the driver 390. In effect, by emulating the interruption when the system is in the VMM context, the HOS handles the I/O request as normal, but the system is prevented from reentering the HOS context until the driver 390 reestablishes it through resetting the IDT to that of the HOS context. In other words, in the VMM context, interrupts are handled according to the IDT 404 in the VMM (path G*), although the hardware will continue to act as if the interrupt had been handled via the IDT 402 in the HOS (path G).

The invention is not restricted to use in architectures in which a register such as the IDTR 400 is incorporated into the hardware processor, or in which such a register can be accessed and changed by software. For example, in certain architectures, the address of the IDT is hard-wired in the processor or is otherwise assumed to be constant. In these cases the predetermined address is the equivalent of the IDTR described above, but is inaccessible to the driver or the VMM. In such architectures, the invention implements interrupt forwarding not by selectively setting and changing the IDTR, but rather by storing the contents of the previously "active" IDT and then writing the currently "active" IDT at the predetermined address.

Note that because the HOS 340 actually manages the resource (in this case, the device 380), it can do so at its full normal speed, in its own context, and that both the VMM and the HOS can operate at the faster system level. The HOS views the emulator 300 as just another device with a driver, albeit one that uses up a very large amount of time (since the VMM calls pass through it). Indeed, the emulator 300 uses so much time that the HOS itself is effectively turned into the slave of the emulator (and thus VMM) as long as the VMM is active, that is, as long as the system is operating in the VMM context.

The co-residence of a HOS and a VMM does not require any modification of the HOS, but it does require some cooperation with the VMM. Specifically, the HOS must retain the ability to manage the resources of the system, including the scheduling of the processor(s), and the allocation of the memory. In the example of memory, the VMM must access only pages of memory that the HOS has allocated to either its corresponding device emulator 300 processor or the driver 390. These pages must be allocated and "locked down" in memory with the guarantee that the HOS will not attempt to reclaim them to use them for another purpose.

In the example of the processor, the VMM must bound the time that it executes in its total context by an amount corresponding to the scheduling granularity. For example, by performing an RPC to the user-level device emulator 300 with some known bounded rate, the VMM voluntarily releases the processor, allowing the HOS to schedule other applications running on the HOS, or other VMMs. This voluntary release of the processor can be implementing by performing an RPC on every external timer interrupt. Since the HOS programs the timer interrupts, it dictates their frequency.

In the preferred embodiment of the invention discussed below, the driver 390 acts as a simple "gate" to pass calls from the VMM 360 to the device emulator 300, as well as implementing the context switch. The driver 390 can therefore be made very simple. In one working implementation of the invention, for example, the device emulator 300 comprised around 30,000 lines of programming code and the VMM 360 needed about 55,000 lines of code. The driver, however, required less than 2,000 lines of code. This configuration leads not only to simplicity, but it also improves portability and generality of the system according to the invention. It is not, however, the only possible embodiment of the invention.

In this working implementation, the VMM is capable of running all major operating systems (Microsoft DOS, Windows 3.1, Windows 95, Windows 98, Windows NT, Linux, and Unix) for the Intel x86 architecture in a virtual machine. The implementation also contains versions of the device emulator and the driver for two distinct host operating systems: Windows NT and Linux. As an illustrative example of the independence of the HOS and the VMM, the identical VMM is capable of co-residency with either a Windows NT or a Linux HOS.

Figure 7:
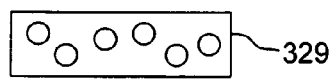
FIG. 7 is a block diagram of a second embodiment of the invention.

FIG. 7 illustrates a second embodiment of the invention, and is to be compared with the first embodiment shown in FIG. 3. Features common to both embodiments have the same reference numbers in the two figures. In this second embodiment, the VMM and HOS still co-exist at the system level, with different contexts, but instead of a relative large emulator 300 and a minimal driver 390, the second embodiment includes a very small shell application 700 at the user level, and incorporates the device emulator 702 in the HOS 340 itself. In essence, the emulator 702 is a combination of the driver 390 and the emulator 300; the shell 700 does nothing more than initiate calls, from its user level, to the HOS 340.

To the extent that the HOS allows calls that cross the driver API 394, then the system-level emulator 702 may be designed to take advantage of this possibility to speed up the system by reducing the number of necessary crossings of the application API 392. This potential increase in speed, however, has its costs. First, the code that must be downloaded into the HOS becomes much larger and more complex. Second, the system is much less portable and general, since it is much more closely tied to the particular HOS.

In the preferred embodiments of the invention, the driver 390 is downloaded into the HOS 340. This provides for the greatest possible flexibility, portability and generality, but it is not strictly necessary according to the invention. Instead, the driver 390 may be pre-loaded into or even made an integral part of the HOS. This might be desirable, for example, if the producers of the HOS expect their customers to want to use this invention to run one or more VMMs at system level, co-resident with the HOS.

Refer once again to FIG. 6. Using the total switch according to the invention, the IDTR 400 can be set by the system-level driver 390 to point to the IDT of any VMM, or of the HOS. Note, however, that because of the complete contextual separation of the HOS and the VMM, the VMM can be replaced by any other system-level component that is not a VMM as long as it maintains the same cooperation with the HOS that the VMM has. The total switch according to the invention can be used to implement interrupt forwarding even to sub-systems other than virtual machine monitors. In other words, path G* could lead to any sub-system or system-level component, not just to a VMM. For example, the invention could be used to run specialized or application-specific operating systems at system level, or to run applications that need to configure the hardware processor in particular ways.

We claim:

1. A computer storage media having a computer program product that is executable within a host computer system, which has a processor and a host operating system (HOS), the computer program product comprising computer-executable code:

for implementing an interface software layer between the host operating system and a virtual machine, instructions of which are executed on the processor, wherein at runtime, the interface software runs independently of the HOS, the interface software operates with its own address space and with its own interrupt and exception handlers;

for reading in and storing state information of the processor associated with the HOS; and for logically decoupling the HOS from the processor with respect to pre-determined functions of the interface software layer and the virtual machine by setting the processor state information to settings associated with the interface software layer.

2. The computer program product of claim 1, further comprising computer-executable code for logically recoupling the HOS to the processor by writing to the processor the processor state information associated with the HOS.

3. The computer program product of claim 1, in which the interface software layer is a virtual machine monitor acting as a system-level interface for the virtual machine.

4. The computer program product of claim 1, wherein the computer program product further comprising programming instructions to implement a device emulator, which at run time executes at as a user-level application on top of the HOS.

5. The computer program product of claim 4, wherein the device emulator, at run time, uses standard operating system calls to access physical devices.

6. The computer program product of claim 5, wherein physical devices includes a disk drive.

7. The computer program product of claim 1, wherein the computer program product further comprising programming instructions to allow the interface software to configure a processor independently of the HOS.

* * * * *

UNITED STATES PATENT AND TRADEMARK OFFICE
CERTIFICATE OF CORRECTION

PATENT NO.       : 7,665,088 B1                    Page 1 of 1
APPLICATION NO.  : 11/219070
DATED            : February 16, 2010
INVENTOR(S)      : Bugnion et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1091 days.

Signed and Sealed this

Seventh Day of December, 2010

David J. Kappos
*Director of the United States Patent and Trademark Office*